United States Patent
Voce

(10) Patent No.: US 6,246,874 B1
(45) Date of Patent: Jun. 12, 2001

(54) METHOD AND APPARATUS FOR PREDICTING SPOT BEAM AND SATELLITE HANDOVER IN A MOBILE SATELLITE COMMUNICATION NETWORK

(75) Inventor: Daniel A. Voce, Germantown, MD (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/213,027

(22) Filed: Dec. 16, 1998

Related U.S. Application Data

(60) Provisional application No. 60/083,482, filed on Apr. 29, 1998.

(51) Int. Cl.$^7$ .............. H04Q 7/20; H04B 7/185
(52) U.S. Cl. ............. 455/428; 455/439; 455/440; 455/13.1
(58) Field of Search .............. 455/427, 121, 455/436, 440, 428, 439, 13.1, 13.2; 370/316

(56) References Cited

U.S. PATENT DOCUMENTS

| | | | |
|---|---|---|---|
| 5,161,248 | 11/1992 | Bertiger et al ............... | 455/17 |
| 5,483,664 | * 1/1996 | Moritz et al. ............... | 455/13.1 |
| 5,669,061 | * 9/1997 | Schipper ............... | 455/429 |
| 5,784,695 | 7/1998 | Upton et al. ............... | 455/442 |
| 5,884,164 | * 3/1999 | Gérard et al. ............... | 455/428 |
| 5,999,797 | * 12/1999 | Zancho et al. ............... | 455/12.1 |
| 6,038,447 | * 3/2000 | Rouffet et al. ............... | 455/430 |
| 6,064,883 | * 5/2000 | Smith ............... | 455/428 |
| 6,122,507 | * 9/2000 | Gérard et al. ............... | 455/428 |

* cited by examiner

*Primary Examiner*—William G. Trost
*Assistant Examiner*—Rafael Perez-Gutierrez
(74) *Attorney, Agent, or Firm*—John T. Whelan; Michael W. Sales

(57) ABSTRACT

A method and apparatus for predicting when to perform spot beam and satellite handover in a mobile satellite communication network that uses the position of the mobile subscriber. The method and apparatus perform all calculations with respect to a satellite-based coordinate system, thereby eliminating the need to model the shape of the geometrically complex spot beams on the surface of the earth. The position of a mobile subscriber unit that initiates a call is tracked relative to a set of spot beam boundaries that are located equidistant between a first spot beam within which the subscriber unit is located at the time of call initiation and a set of adjacent spot beams. An interval during which the subscriber unit will cross over one of the boundaries is estimated. The spot beam into which the subscriber is traveling is identified, and the interval is adjusted until a desired level of accuracy has been achieved at which time the call is transferred from the first spot beam to the adjacent spot beam at the estimated time. For satellite handover, an angle of elevation between the subscriber unit and the satellite is calculated and compared to a threshold angle. When the angle of elevation drops below the threshold angle due to the movement of the satellite, the call is transferred from a first satellite to a neighboring second satellite.

8 Claims, 6 Drawing Sheets

METHOD AND APPARATUS FOR PREDICTING SPOT BEAM AND SATELLITE HANDOVER IN A MOBILE SATELLITE COMMUNICATION NETWORK

This application claims the benefit under 35 U.S.C. § 119(e) of the filing date of Provisional Application No. 60/083,482, filed Apr. 29, 1998.

(a) FIELD OF THE INVENTION

This invention relates generally to mobile satellite communication networks and, more particularly, to a method for predicting spot beam and satellite handover that utilizes the position of the mobile caller relative to the position of the satellite to estimate the time at which handover should occur.

(b) DESCRIPTION OF THE RELATED ART

Terrestrial cellular communication systems affect cellular communication in a geographic region via a plurality of stationary transmission towers each of which provides service to an individual service area commonly referred to as a cell. Each cell typically has a diameter in the range of several kilometers. To ensure continuous service to mobile subscribers traveling throughout the geographic region, the towers are positioned in a manner such that the cells are adjacent to and overlap with six other cells provided that the cells are not located on the boundary or edge of the service coverage area. Cells located on the edge of the service coverage area, i.e., an edge cell, may overlap with fewer than six other cells.

In land-based cellular communication systems, the decision to transfer a call from one service area to an adjacent service area (a procedure known as handover or handoff) primarily involves consideration of the signal quality of the on-going call. Typically, a stationary tower servicing a given service area (i.e., a cell) includes equipment to monitor the signal quality of the on-going call. When the measured signal quality decreases beneath a predetermined threshold, the tower transfers the call to the tower that services the adjacent cell into which the mobile subscriber is moving.

Although this method is acceptable in terrestrial cellular systems, the use of signal quality measurement as a means for determining when to effect handover can be subject to large errors in the satellite environment. These errors are typically caused by instability or other errors present in the signal that is transmitted by the earth station for subsequent relay to the mobile unit via the satellite. In particular, if an earth station based modem transmits control signals to a satellite beam at a power level that is different from the nominal level because of instability or other errors, the mobile unit that receives the transmitted signals may erroneously register its position as being inside the beam when in fact it may be outside of the beam or vice versa.

A handover method has been proposed that involves tracking the mobile subscriber's position relative to the nominal cell boundaries to determine when handover should occur. In simplified terms, the method involves modeling the cells and cell boundaries on the earth's surface, then tracking the subscriber's movement relative to the earth based model. Thus, handover is performed when a subscriber crosses a cell boundary thereby moving out of a first cell and into an adjacent, second cell. The method becomes more complicated, however, because, to ensure continuous service coverage, adjacent cells slightly overlap each other. Due to the overlapping regions of adjacent cells, a mobile user may occupy a position that lies in two or three cells simultaneously. To determine when cell handoff should occur for a subscriber located in the overlapping region, it has been proposed that the cells be modeled using inscribed hexagons wherein the sides of the hexagons bisect the overlapping regions of the cells. The hexagons do not overlap but instead are placed in an abutting manner so that, when viewed together, they form a honeycomb-like grid. Thus, the hexagon boundaries are lines of demarcation used, in relation to the subscriber, to determine when handoff is to occur. For example, a call made by a subscriber located within the boundaries of a hexagon is serviced by the cell corresponding to that hexagon. When the mobile subscriber travels into an adjacent hexagon, then the call is handed over to the cell corresponding to this adjacent hexagon.

This proposed method of tracking a mobile subscriber's position relative to an earth based modeling system has several drawbacks when used in the non geo-stationary satellite environment. For example, in a non geo-stationary satellite communication system, a direct radiating antenna projects a plurality of circularly shaped spot beams onto the earth. Each spot beam represents a single service area or cell, such that a call made by a subscriber located within the boundaries of the cell are serviced by the corresponding spot beam. However, the spot beams, when mapped onto the surface of the earth, do not have a circular shape but instead have an elliptical shape due, in part, to the angle at which the satellite projects the beams onto the earth and also due to the spherical shape of the earth. Because of the elliptical shape of the spot beams, the inscribed hexagons used to model the spot beams and demarcate the cell boundaries are irregularly shaped, thereby making it very difficult to track the position of the subscriber relative to the irregular boundary. In addition, unlike the stationary hexagons used in a land-based system, the hexagons in the non geo-stationary satellite system are typically hundreds of kilometers in diameter and move over the surface of the earth in conjunction with the spot beam antenna on the satellite. To further complicate matters, various points on the boundaries of the hexagons move at different speeds. Thus, complex and time consuming geometrical procedures are required to model the rapid movement of the large, irregularly shaped hexagons. Moreover, the spherical shape of the earth causes the hexagons to be particularly distorted at the North and South poles so that the complex modeling procedures routinely lack precision in these areas.

Thus, there is a need in the art of satellite communications for a simplified method for predicting when handover should occur that is not subject to the polar sensitivity seen in the existing and proposed methods.

SUMMARY OF THE INVENTION

In one aspect, the present invention is directed to a method for performing handover in a satellite communication system. In particular, the method is used to determine when to transfer a call associated with a first spot beam to a second spot beam in a satellite communication system wherein the call is transmitted between a non geo-stationary satellite and a subscriber unit located in the first spot beam. The movement of the subscriber unit is tracked relative to a satellite based coordinate system and the movement of the subscriber is used to estimate a time at which the satellite will subsequently transfer the call.

In another aspect of the invention, a boundary is located between the first and the second spot beams and an interval of time during which the subscriber will cross over the boundary is estimated. The interval of time is repeatedly adjusted until the interval conforms to a desired level of accuracy.

To adjust the interval, the position of the subscriber within the satellite coordination system is calculated at the end of the interval and then compared to the location of the boundary to determine whether the subscriber has crossed over the boundary during the interval. If the subscriber has not passed over the boundary, then a new value is selected as the end of the interval. If instead, the subscriber has passed over the boundary, then the interval may be narrowed to obtain a more accurate estimate of the interval.

In yet another aspect of the present invention, the position of the subscriber and the position of the satellite are determined relative to an earth based coordinate system. The position of the subscriber is then converted using a transformational matrix such that the converted position is expressed relative to the satellite based coordinate system.

In yet another aspect of the present invention, a method is provided for determining when to transfer a call associated with a first satellite to a second satellite in a satellite communication system wherein the call is being transmitted from the first satellite to a subscriber unit located in a first footprint that is generated by the first satellite. A time at which to transfer the call is estimated, and the position of the subscriber and the position of the satellite at the estimated time are determined. An angle of elevation is calculated using the position of the subscriber and the position of the satellite. The angle is compared to a threshold angle to determine whether the subscriber is moving out of the first footprint into a second footprint that is generated by the second satellite. If the angle of elevation is not less than the threshold angle, a new time is estimated, and the foregoing steps are repeated. If instead the angle of elevation is less than the threshold angle, the call is transferred from the first satellite to the second satellite.

The invention itself, together with further objects and attendant advantages, will best be understood by reference to the following detailed description, taken in conjunction with the accompanying drawings.

DETAILED DESCRIPTION

Figure 1:
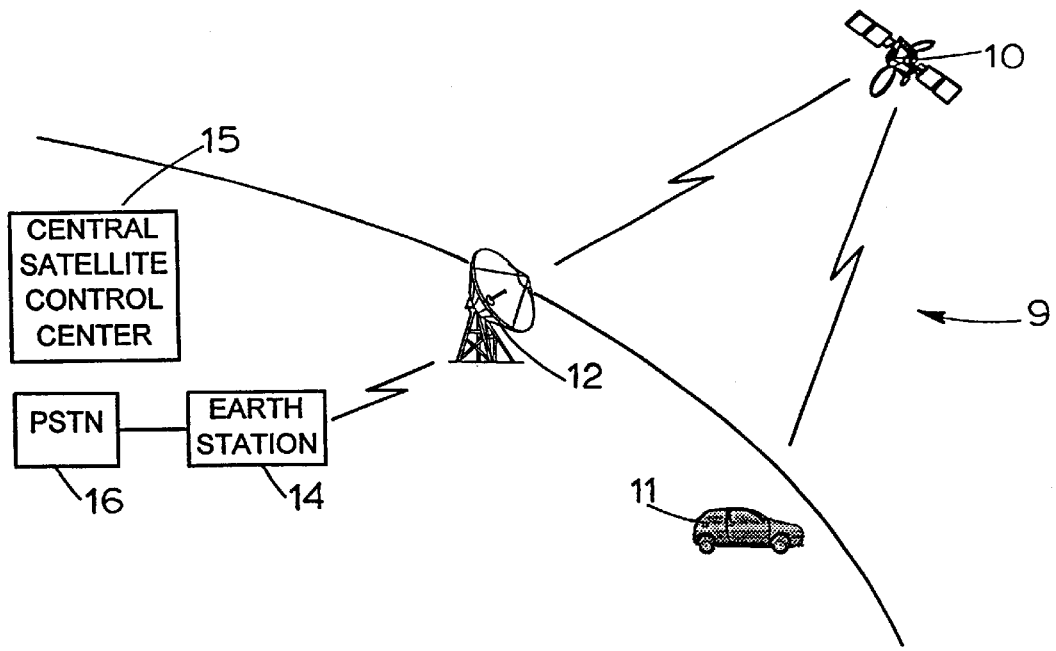
FIG. 1 is a block diagram of a satellite mobile communication system used to implement the method of present invention.
Figure 2:
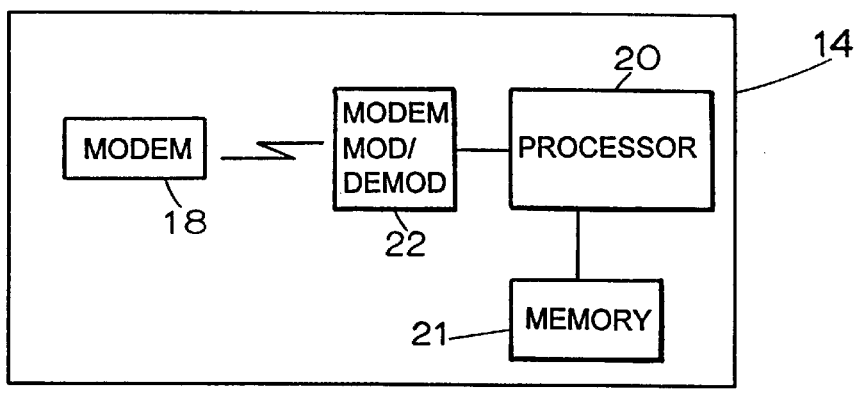
FIG. 2 is a block diagram illustrating further details of the earth station shown in FIG. 1.

Referring to FIG. 1, which illustrates a satellite communication system 9 for use with the present invention, a low to medium earth orbit non geo-stationary satellite 10 relays communication signals from a mobile subscriber unit 11 (e.g., a radio telephone in an automobile) to an earth based feeder antenna 12 and vice versa. The feeder antenna 12, in turn, communicates with an earth station 14 that is coupled to a terrestrial network that includes the public switched telephone network ("PSTN") 16. As shown in FIG. 2, the earth station 14 includes a modem 18 that communicates with the feeder antenna 12 and also communicates with a processor 20 and associated memory 21 via a modem modulator/demodulator 22. Although, for simplicity, FIG. 1 only shows a single satellite 10, earth station 14 and feeder antenna 12, it is understood that the satellite communication system 9 additionally includes any number of satellites (e.g., ten) positioned in preselected orbits to provide continuous overlapping coverage of the earth's surface and a global network of earth-station 14 and feeder-antenna 12 pairs that are interconnected by high speed terrestrial links. The network of earth stations 14 is also linked to a central satellite control center 15 (shown in FIG. 1) that tracks the position of the satellites 10 and provides satellite orbital information such as satellite position and velocity to the earth stations 14.

Figure 3:
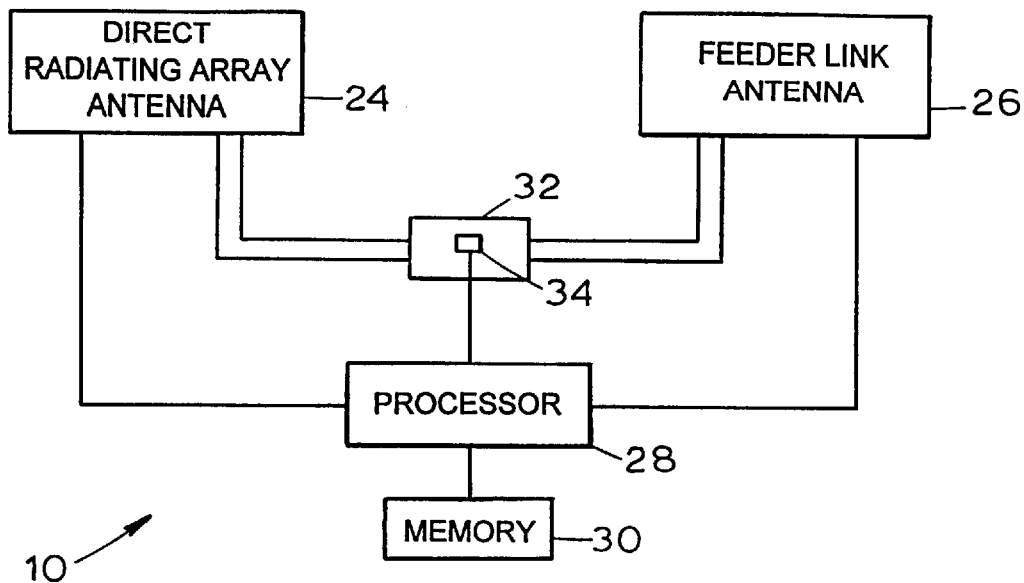
FIG. 3 is a block diagram illustrating further details of the satellite shown in FIG. 1.

FIG. 3 is a diagram illustrating various aspects of the satellite 10 shown in FIG. 1. As shown in FIG. 3, each satellite 10 includes a direct radiating array antenna ("DRA") 24 that supports communication between the mobile subscriber unit 11 and the satellite 10. A feeder link antenna 26 supports communication between the satellite 10 and the earth station 14. The feeder link antenna 26 and DRA 24 are linked to a satellite processor 28 having associated memory 30. In operation, signals originating from the earth station 14 are transmitted by the earth based antenna 12 to the feeder link antenna 26. The signals are then relayed to the mobile subscriber unit 11 via the DRA 24. In addition, signals transmitted by the mobile subscriber unit 11 are received at the DRA 24 and then relayed to the earth station 14 via the feeder link antenna 26. Because the feeder link antenna 26 and DRA 24 transmit and receive at different frequencies, a frequency translator 32 is used to convert the frequency of transmitted/received signals, thereby allowing signals received at the DRA 24 to be transmitted by the feeder link antenna 26 and vice versa. In addition, the frequency translator 32 includes a signal extraction circuit 34 for extracting control signals that are then provided to the processor 28. The processor 28 is adapted to control the operation of the frequency translator 32, the feeder link antenna 26 and the DRA 24 in response to the extracted control signals. The satellites 10 and earth stations 14 will additionally include well-known and conventional circuitry that performs call processing and synchronization steps needed to coordinate signal traffic between the satellites 10 and the PSTN 16.

Figure 4:
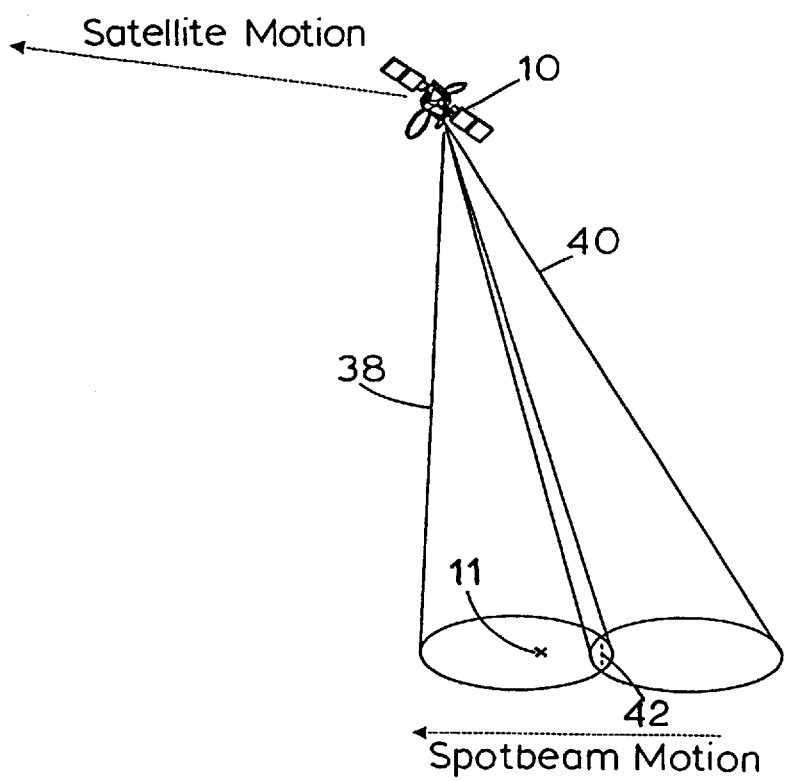
FIG. 4 illustrates a satellite projecting two spot beams onto the earth.

Referring now to FIGS. 3 and 4, the DRA 24 on board the satellite 10 includes circuitry adapted to project a first and a second spot beam 38, 40 each of which include both a beam used for transmitting signal and a beam used for receiving signals. Although only two spot beams 38, 40 are shown, in practice the DRA 24 actually generates a plurality of such spot beams. The spot beams 38, 40 provide satellite voice and data service to mobile subscribers located within a geographical region that is analogous to a cell of a terrestrial cellular telephone system. The spot beams 38, 40, when projected onto the earth's surface, generally have a diameter spanning a range of several hundred kilometers and are positioned such that each non-edge beam, i.e., beams not located on the edge of the service coverage, slightly overlaps six other beams. In addition, the satellites 10 are positioned such that the service coverage provided collectively by the spot beams of each satellite 10 overlaps slightly with the service coverage provided by the other satellites 10 to ensure contiguous service coverage over the entire surface of the earth.

A typical call processing sequence initiated by, for example, the mobile subscriber unit 11 located in spot beam 38, begins when the mobile subscriber 11 dials the telephone number desired to be reached. The dialed digits, which represent the destination address of the call, are transmitted by the mobile unit 11 via the spot beam 38 to the satellite 10 which, in turn, forwards the digits to the earth station processor 20 via the earth based antenna 12. In response to the received digits, the earth station processor 20 forwards the destination address to a switch (not shown) residing at the PSTN 16 which responds by opening the channel corresponding to the destination address. In addition, the earth station processor 20 assigns a set of two transmission frequencies, a first of which will be used for call transmission between the satellite 10 and the earth station 14 and a second of which will be used for call transmission between the satellite 10 and the mobile subscriber unit 11. The earth station processor 20 transmits information regarding the set of assigned frequency channels to the satellite 10. The satellite processor 28 stores the channel information in memory 30 and causes the spot beam 38 to transmit/receive the call on the assigned channel frequency. In addition, the satellite 10 forwards the channel information to the mobile unit 11. A transceiver (not shown) in the mobile subscriber unit 11 then re-tunes to the assigned frequency to effect call transmission. Call termination and other call processing functions are performed in a similar manner with control emanating from the earth station processor 20.

Referring still to FIG. 4, because the satellite 10 is non geo-stationary, the spot beams 38, 40 are moving relative to the mobile subscriber unit 11. It is assumed that the satellite 10 is positioned and moving such that the mobile subscriber unit 11 may eventually occupy a position within the adjacent spot beam 40, provided that the call is maintained for the length of time required for the satellite 10 to move the length of the spot beam 38. In addition, because the rapid movement of the satellite 10 relative to the earth greatly exceeds any possible movement of the mobile unit 11, the mobile subscriber unit 11 is assumed to eventually occupy a position within the adjacent spot beam 40 regardless of the speed at which the subscriber unit 11 may be moving. To provide continuous, uninterrupted service to the on-going call initiated by the mobile subscriber unit 11, the on-going call is transferred from the spot beam 38 to the spot beam 40 in a so-called spot beam "handover" process that is controlled by the earth station processor 20. Ideally, the handover should occur when a boundary 42 that intersects the overlapping region of the spot beams 38, 40 crosses over the subscriber unit 11. However, the curvature of the earth and the angle at which the satellite 10 projects the spot beams 38, 40 onto the earth causes the spot beams 38, 40 to have an irregular, elliptical shape when mapped onto the earth's surface. In addition, due to the high speed of the satellite 10, various points on the ellipse are moving at different speeds. Thus, the irregularity of the ellipses and the differential speed of the ellipse boundaries make it difficult to track the movement of the spot beams 38, 40 with respect to the subscriber unit 11 in an earth based coordinate system.

To reduce the computational complexity required to track the movement of spot beams of the type illustrated in this disclosure, the present invention uses a satellite based coordinate system to track the movement of the satellite 10 and the movement of the spot beams 38, 40 relative to the subscriber unit 11. In particular, the satellite based coordinate system is defined as a three dimensional right angle coordinate system wherein the positive x axis is defined as a vector pointing in the direction of the movement of the satellite, the positive z axis is defined as a vector pointing in the same direction as the satellite nadir and the positive y axis is defined as a plane that forms a right angle with the x and the z axes and that originates at the origin of the x-z plane. With respect to the satellite based coordinate system, the satellite 10 is stationary and the subscriber unit 11 is moving. The spot beams 38, 40, when projected onto the x-y plane of the satellite based coordinate system, are accurately represented as circles rather than ellipses, thereby greatly reducing the complexity of the computations used to track the movement of the subscriber unit 11 relative to the satellite 10.

As a brief overview, the method of the present invention is implemented by the earth station 14 and employs an iterative binary search technique to successively approximate a window of time during which the subscriber unit 11 will move from the first beam 38 into the second beam 40. The second spot beam 40 is merely intended to represent the spot beam into which the mobile subscriber unit 11 moves and, depending upon the direction of satellite movement, may actually be any of the spot beams that are adjacent to the spot beam 38. After a call is initiated, an interval during which the subscriber unit 11 will cross over the boundary 42 between the adjacent beams 38, 40 is determined by tracking the position of the subscriber unit 11 relative to the spot beam boundary 42 in the satellite based coordinate system. Thereafter, the duration of the interval is repeatedly adjusted until the interval has been calculated to the desired degree of accuracy. Once an interval having the desired degree of accuracy is obtained, the midpoint of the interval is selected as the time at which the processor 20 residing in the earth station 14 causes the satellite processor 28 and the mobile subscriber unit 11 to effect handover.

Figure 5:
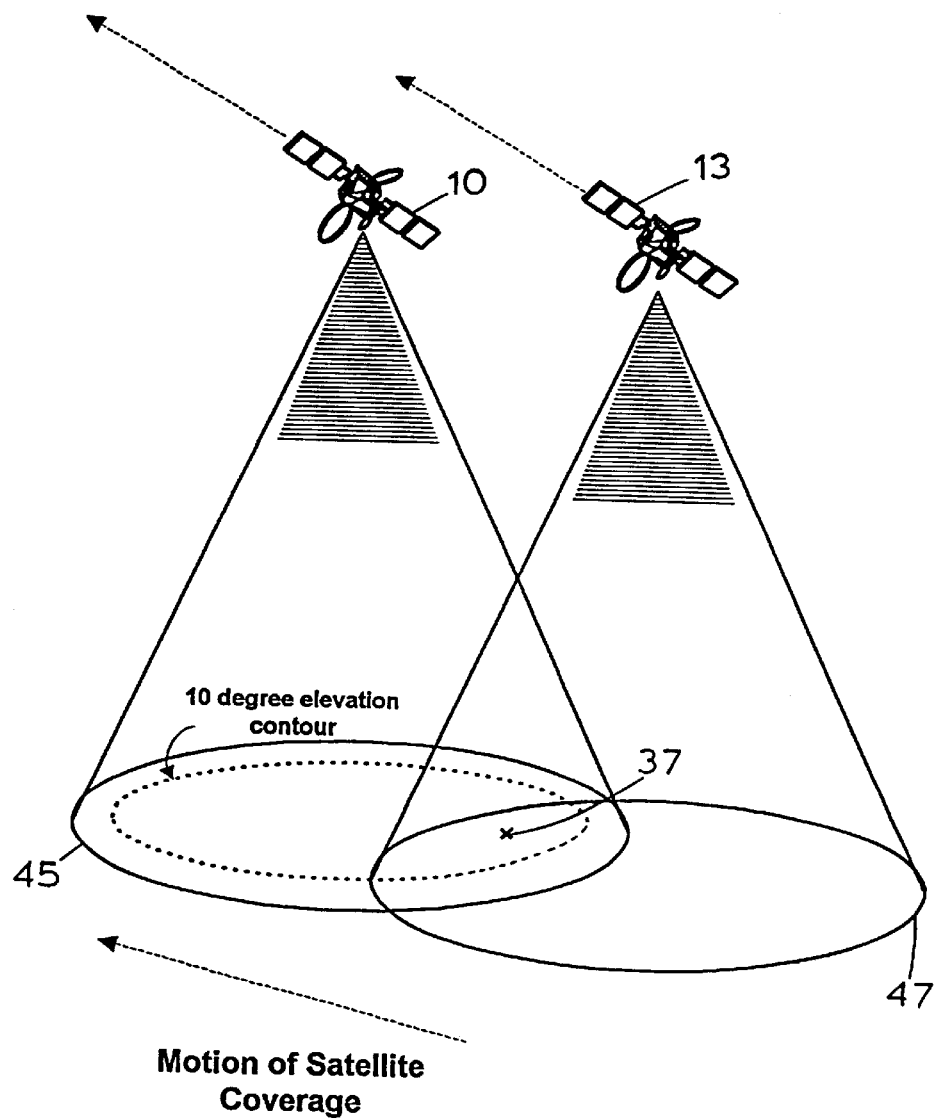
FIG. 5 illustrates two neighboring satellites projecting satellite footprints onto the earth.
Figure 6:
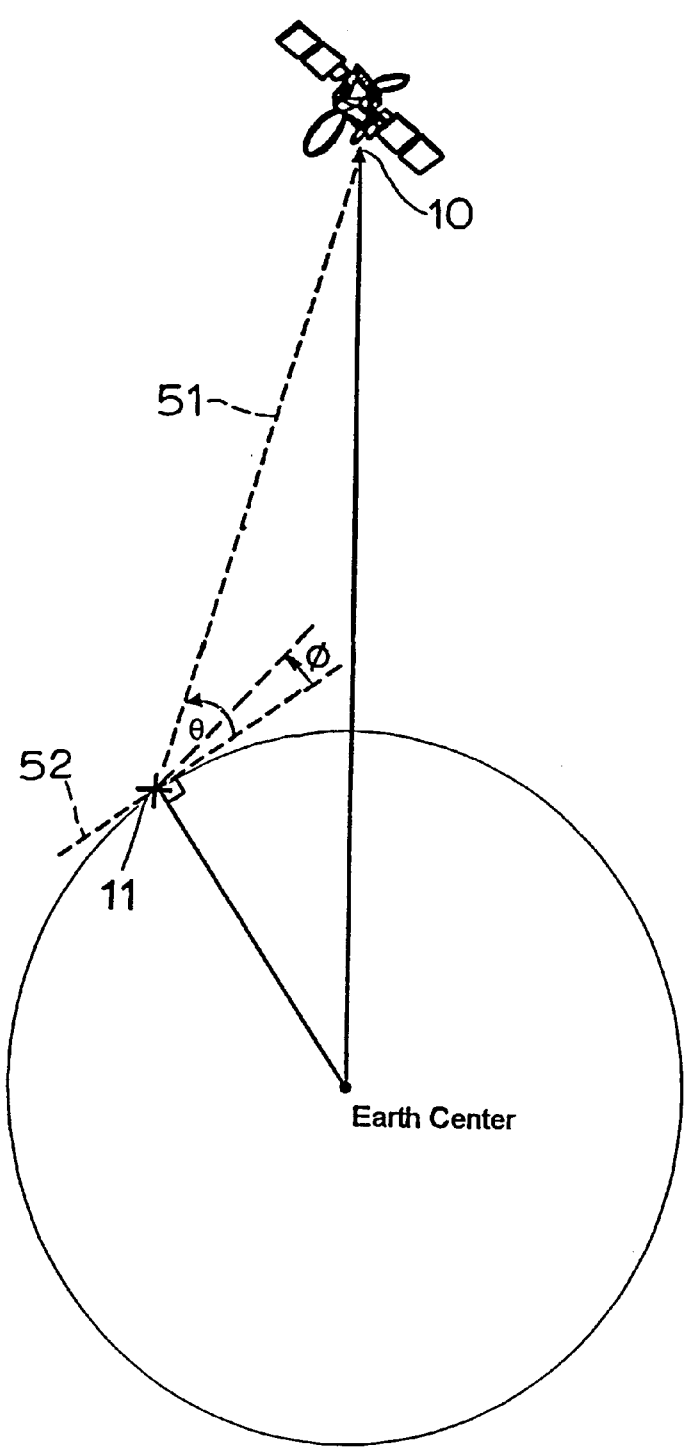
FIG. 6 illustrates the angle of elevation calculated in accordance with the present invention.

Referring now to a more detailed description of the present invention, FIG. 5 shows the satellite 10 and a neighboring identically equipped satellite 13. To ensure contiguous coverage of the earth's surface, the satellite 10 is positioned so that the service coverage provided collectively by the spot beams of the satellite 10, referred to as the satellite footprint 45, overlap with the footprint 47 generated by the neighboring satellite 13. Due to satellite movement, an ongoing call initiated by the subscriber unit 11 located within the footprint 45 will later occupy a position within the footprint 47. To provide uninterrupted phone service for the ongoing call, the call is transferred from the satellite 10 to the satellite 13 by a handover process that is referred to as satellite handover. Referring also to FIG. 6, to determine when to perform satellite handover, the processor 20 of the earth station 14 (shown in FIGS. 1 and 2), according to the method of the present invention, determines an angle of elevation θ between the subscriber unit 11 and the satellite 10. The angle is defined by a vector 51 drawn from the satellite 10 to the subscriber unit 11 and a vector 52 that is tangential to the earth's surface at the location of the subscriber unit 11. The magnitude of the angle of elevation θ is then compared to a threshold angle φ. If the angle of elevation θ is less than the threshold angle φ then the call is transferred to the neighboring satellite 13. For illustrative purposes, an elevation contour corresponding to a threshold angle of 10 degrees is shown in FIG. 5 such that a subscriber located within the region bordered by the elevation contour and the outer edge of the footprint 45 is considered a satellite handover candidate.

Figure 7:
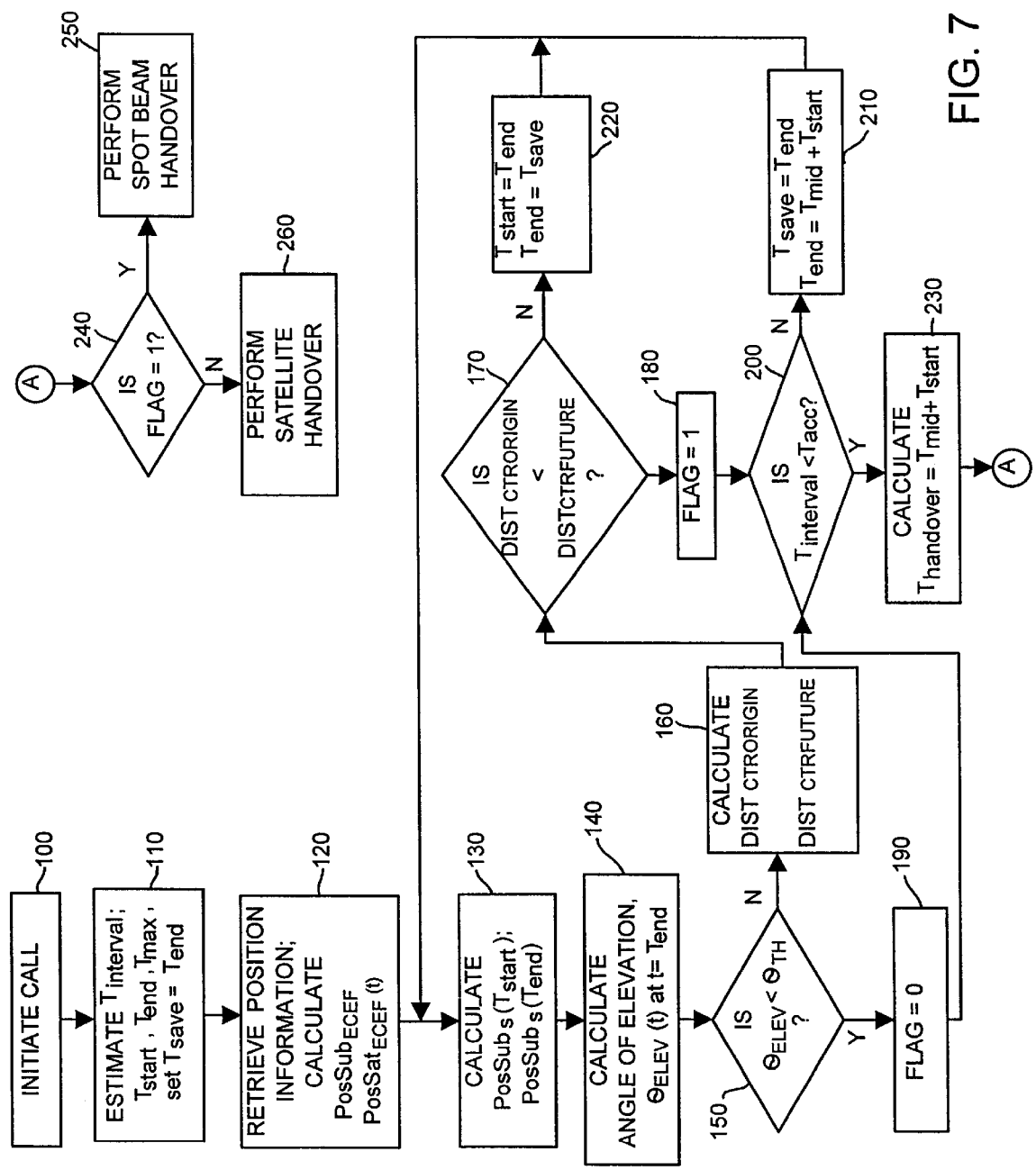
FIG. 7 is a flow chart showing the steps of the method of the present invention.

Referring now to FIG. 7, there is illustrated a flow diagram embodying the method of the present invention. The disclosed method used to determine when handover should occur is executed by the processor 20 residing in the earth station 14, whereas the actual steps implemented to transfer the call are executed by the earth station processor 20 operating in conjunction with the satellite 10 and the mobile subscriber unit 11. To aid in the description, spot beam handover will be described with reference also to FIG. 4, and satellite handover will be described with reference also to FIG. 5. Control begins at a block 100 when a call is initiated by the mobile subscriber unit 11 geographically located within the originating spot beam 38 generated by the satellite 10, which, due to the orbit and velocity of the satellite 10, will subsequently be located in the future spot beam 40. As will be understood by one having ordinary skill in the art, control may also begin at the block 100 after an on-going call is transferred into the beam 38 in preparation for the next handover to the beam 40 or when a terrestrial system caller initiates a call to the mobile subscriber unit 11 located in beam 38. It will be further understood that, regardless of the origin of the call, i.e., mobile subscriber unit 11 or PSTN16, at the start of the method, the call is initially associated with a first spot beam (e.g., spot beam 38), such that communication between the satellite and mobile subscriber unit 11 is conducted via this first spot beam. Moreover, at a time in the future, the subscriber unit 11 will be associated with a second spot beam, in this example spot beam 40, in the same manner.

Next, control passes to a block 110 wherein the processor 20 estimates an interval, designated $T_{interval}$, during which the subscriber unit 11 is expected to cross over the boundary 42 between the originating beam 38 and the future beam 40. The beginning of $T_{interval}$ is denoted $T_{start}$ and is assigned the value of the time at which the method of the present invention was invoked which will typically correspond to the time at which the call was initiated or the time at which a call setup procedure was initiated. A call setup procedure includes the conventional and well-known steps that occur upon call initiation or call transfer to define various parameters of the call transmission. Next, using the velocity of the satellite 10 and the diameter of the spot beams 38, 40, the maximum amount of time that will be required for the satellite 10 to traverse the distance corresponding to one spot beam is determined and denoted $T_{max}$. To obtain the end of the interval, denoted $T_{end}$, the time $T_{max}$ is added to the time of interval start, $T_{start}$. Note that the subscriber unit 11 is located in the originating beam 38 at $T_{start}$ and, because the duration of $T_{end}$ is selected to be long enough for the satellite 10 to have moved one beam length, it is known that at the time, $T_{end}$, the subscriber unit 11 is located in the future beam 40. Thus, $T_{interval}$ represents an estimate of the time interval during which the subscriber unit 11 will move from the originating spot beam 38 into the future spot beam 40. Finally, the processor 20 stores the value of $T_{end}$ for subsequent processing by setting a variable $T_{save}$ equal to $T_{end}$ ($T_{save}=T_{end}$). Note, however, that the adjacent spot beam into which the mobile subscriber will move is not yet known, so that at this point, the future spot beam 40 represents any one of the spot beams that is adjacent to the spot beam 38.

Next, control passes to a block 120 where the processor 20 retrieves information from the associated memory 21 regarding the position of the satellite 10 and the position of the mobile subscriber unit 11 at the time of call initiation. The earth station processor 20 then uses this retrieved information which may include, for example, the measured signal delay between the satellite 10 and mobile subscriber unit 11 and the Doppler effect experienced at the mobile subscriber unit 11, to calculate the position of the satellite 10 and the position of the mobile subscriber unit 11. To aid in this calculation, the central satellite control center 15 provides information regarding the position of the satellite 10 and the movement of the satellite 10 to the earth station 14 on a daily basis. Of course, it will be understood by one having ordinary skill in the art that the positions of the mobile subscriber unit 11 and the satellite 10 may be determined using any alternative means known in the art and need not be performed exclusively by the processor 20 but may instead be calculated by, for example, the mobile subscriber unit 11, provided that the calculated positional information is thereafter transmitted to the processor 20.

The processor 20 then uses the positional information retrieved from the memory 21 to determine the position of the subscriber unit 11, denoted $PosSub_{ECEF}$, and the position of the satellite, denoted $PosSat_{ECEF}(t)$, which are defined relative to an earth centered earth fixed ("ECEF") coordinate system that rotates with the earth. In the three dimensional ECEF coordinate system the positive x axis is defined as the vector emanating from the center of the earth and intersecting 0° longitude and 0° latitude, the z axis is defined as the line that intersects the center of the earth and that extends through the north and south poles and the y axis is defined as the line that intersects the center of the earth and occupies a position such that the y axis forms a right angle with both the x and z axes.

Because the speed of the satellite 10 dwarfs the speed of the subscriber unit 11, the subscriber unit 11 may be assumed stationary to simplify processing without greatly affecting accuracy. As a result, the position of the mobile subscriber unit 11, $PosSub_{ECEF}$, is determined only at the time of call setup and is assumed fixed for the duration of the call. Of course, should such positional data be available, it may be incorporated into the method of the present invention by replacing the stationary position vector $PosSub_{ECEF}$ with a time varying position vector $PosSub_{ECEF}(t)$.

Next, at a block 130, the processor calculates a unit vector $PosSub_s(t)$ at $t=T_{start}$ and at $t=T_{end}$. The vector $PosSub_s(t)$, which originates at the satellite 10 and points toward the subscriber unit 11, is used to represent the position of the subscriber unit 11 relative to the satellite based coordinate system and is calculated as follows:

$$PosSub_S(t) = M_R(t) \frac{PosSub_{ECEF} - PosSat_{ECEF}(t)}{|PosSub_{ECEF} - PosSat_{ECEF}(t)|}$$

where $M_R(t)$ is a three by three dimensional rotational transformation matrix defined as follows:

$$M_R(t) = \begin{pmatrix} x(t) \\ y(t) \\ z(t) \end{pmatrix}$$

where $x(t) = y(t) \otimes z(t)$ and where $y(t) = \frac{-PosSat_{ECEF}(t) \otimes VelSat_{ECEF}(t)}{\|PosSat_{ECEF}(t) \otimes VelSat_{ECEF}(t)\|}$ and where $z(t) = \frac{-PosSat_{ECEF}(t)}{\|PosSat_{ECEF}(t)\|}$ and where $VelSat_{ECEF}(t)$ is the velocity of the satellite.

Next, at a block 140, the processor 20 determines the angle of elevation, $\theta_{elev}$ (see FIG. 6), of the subscriber unit 11 at the time $T_{end}$ which will be used later to determine whether satellite handover should occur. To calculate $\theta_{elev}$, the processor 20 uses the position of the subscriber unit 11, PosSub$_{ECEF}$, and the position of the satellite 10, PosSat$_{ECEF}$(t) as follows:

$$\theta_{ELEV}(t) = \cos^{-1}\left\{\frac{-PosSub_{ECEF} \odot (PosSat_{ECEF}(t) - PosSub_{ECEF})}{\|-PosSub_{ECEF}\|\|(PosSat_{ECEF}(t) - PosSub_{ECEF}\|}\right\} - \frac{\pi}{2}$$

where t=T$_{end}$.

At a block 150, to determine whether satellite handover is necessary, the processor 20 compares $\theta_{elev}$, to the threshold angle, $\theta_{TH}$. If the comparison reveals that $\theta_{elev}$ is greater than $\theta_{TH}$, then satellite handover is not required and control passes to a block 160.

Figure 8:
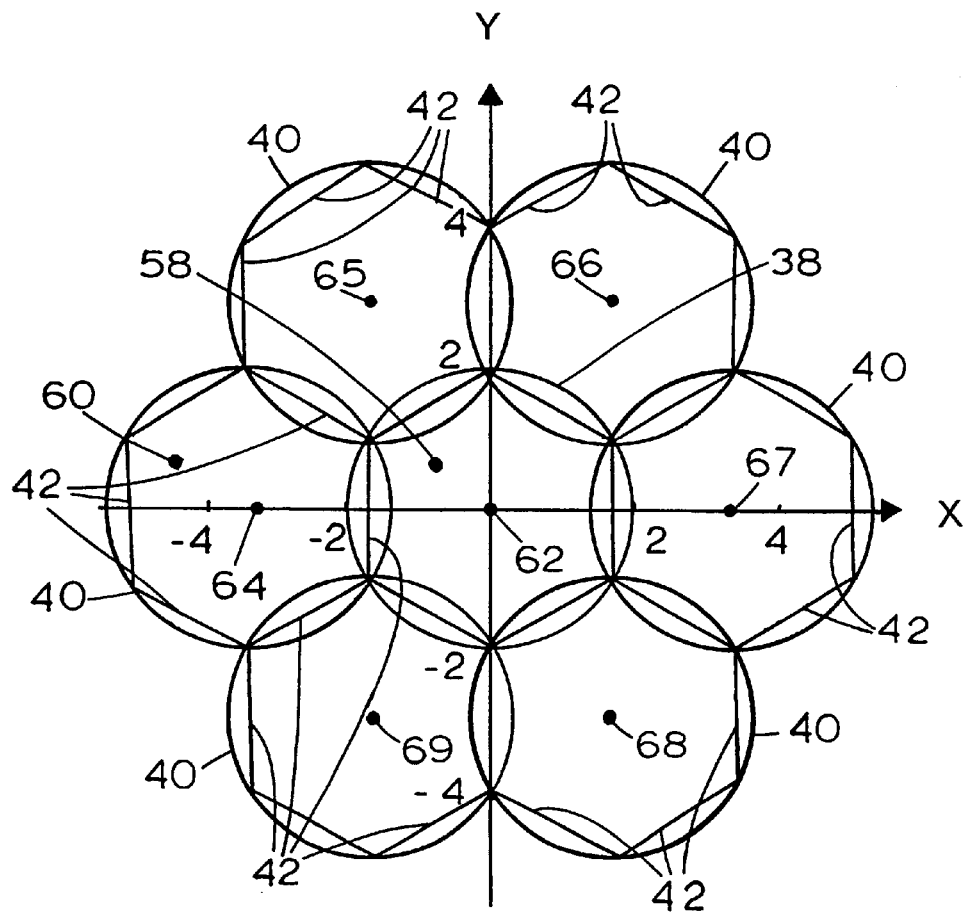
FIG. 8 illustrates the position of the subscriber and the spot beams projected onto the x-y plane of the satellite-based coordinate system.

At the block 160, to determine the position of the subscriber unit 11 relative to the positions of the adjacent spot beams 40 and the originating spot beam 38, the processor 20 uses standard geometrical methods to project the vectors PosSub$_{S(Tend)}$ and PosSub$_S$(T$_{start}$) onto the x-y plane of the satellite based coordinate system. Referring also to FIG. 8 which shows the originating spot beam 38 and adjacent spot beams 40 projected onto the x-y plane of the satellite based coordinate system in units of degrees, the point indicated with the reference numeral 58 represents the point at which the vector PosSub$_S$(T$_{start}$) projects to the x-y plane and the point indicated with the reference numeral 60 represents the point at which the vector PosSub$_s$(T$_{end}$) projects to the x-y plane. A center 62 of the originating spot beam 38, denoted CTR$_{origin}$, and a center 64, 65, 66, 67, 68 and 69 of each of the adjacent spot beams 40, denoted CTR$_{future}$, are used to calculate the distances between the position of the subscriber at T$_{end}$ and each of the beam centers 62, 64, 65, 66, 67, 68 and 69 as follows:

$$Dist_{CTRORIGIN} = |CTR_{ORIGIN} - PosSub_S(T_{end})|$$

$$Dist_{CTRFUTURE} = |CTR_{FUTURE} - PosSub_S(T_{end})|$$

where Dist$_{CTRORIGIN}$ represents the distance between the subscriber at time T$_{end}$ and the center of the originating beam 38 and where Dist$_{CTRFUTURE}$ represents the distance between the subscriber at time T$_{end}$ and the center of each of the possible future beams 40. Of course a plurality of different values for Dist$_{CTRFUTURE}$ must be calculated, each pertaining to a different one of the centers of the spot beams 40. The plurality of Dist$_{CTRFUTURE}$ values may be distinguished by adding subscripts such as, for example 1,2,3 etc. to the various values of Dist$_{CTRFUTURE}$. For example, the distance between the subscriber at T$_{end}$ and the center 64 may be represented with Dist$_{CTRFUTURE1}$ and the distance between the subscriber at T$_{end}$ and the center 65 may be represented by Dist$_{CTRFUTURE2}$, etc.

Control then passes to a block 170 where the processor 20 tests to determine whether the subscriber unit 11 has crossed the boundary 42 between the orignating beam 38 and any of the adjacent beam 40 during T$_{interval}$. Because the boundaries a between the originating spot beam 38 and the adjacent spot beams 40, which are indicated by the reference numeral 42, are located equidistant from the centers 62, 64, 65, 66, 67, 68 and 69 of the beams 38, 40, the magnitude of Dist$_{CTRorigin}$ is compared to the magnitude of each value of Dist$_{CTRfuture}$ to determine whether the subscriber unit 11 has passed any of the boundaries 42 during the interval. In the event that the subscriber unit 11 is closer to the center of the originating beam 38 such that Dist$_{CTRorigin}$ is less than any of the values of Dist$_{CTRfuture}$, then the subscriber unit 11 has not crossed over any of the boundaries 42 at the time T$_{end}$. Conversely, if Dist$_{CTRorigin}$ is greater than any of the values of Dist$_{CTRfuture}$, then the subscriber unit 11 has crossed over one of the boundaries 42 lying between the originating beam 38 and one of the adjacent beams 40 at the time T$_{end}$. If the value of Dist$_{CTRorigin}$ is greater than only one of the values of Dist$_{CTRfuture}$ then the adjacent beam corresponding to that particular value of Dist$_{CTRfuture}$ is identified as the future beam 40 in which the subscriber will be located at the time T$_{end}$. If, instead, the value of Dist$_{CTRorigin}$ is greater than more than one of the values of Dist$_{CTRfuture}$ then the adjacent beam corresponding to the lowest value of Dist$_{CTRfuture}$ is identified as the future beam 40 in which the subscriber will be located at the time T$_{end}$. For illustrative purposes only, in FIG. 8 the subscriber unit 11 is shown occupying a position in the future beam 40 having the center 64 at the time T$_{end}$ as indicated by the point 60. Once the future beam 40 into which the subscriber is moving has been identified, then control passes to a block 180. At the block 180, a handover flag, FLAG, is set to 1 (FLAG=1). If at the block 150, it has instead been determined that $\theta_{ELEV}$ is less than $\theta_{TH}$, thereby indicating that satellite handover is appropriate, then, after the block 150 control passes to the block 190 where the FLAG is cleared (FLAG=0). After blocks 180 and 190 control proceeds to a block 200.

Thus, at the block 200, it is known that either spot beam handover or satellite beam handover is appropriate during T$_{interval}$ but the precise time of handover within that interval is not known. Moreover, if it has been determined that spot beam handover is appropriate, the future beam 40 into which the mobile subscriber unit is moving has been uniquely identified among the adjacent beams 40. To best estimate the time of handover, the midpoint of T$_{interval}$ is selected as the time at which handover will occur and is designated as T$_{mid}$. Thus, T$_{mid}$ is, at most, inaccurate by T$_{interval}$/2. Therefore, at a block 200, the processor tests the accuracy of T$_{mid}$ by comparing the length of T$_{interval}$ to a predetermined threshold accuracy T$_{acc}$ to determine whether the time to handover, T$_{mid}$, has been calculated to the desired degree of accuracy.

If the length of the interval, T$_{interval}$, is greater than T$_{acc}$ therby indicating that the desired degree of accuracy has not been reached, then control passes to a block 210 where the processor reduces the duration of T$_{interval}$ to more accurately pinpoint the time of handover. Prior to reducing T$_{interval}$, however, the processor 20 stores the value of T$_{end}$ as T$_{save}$ (T$_{save}$=T$_{end}$). Then, to reduce T$_{interval}$, the processor 20 changes the time T$_{end}$ to occur earlier as follows:

$$T_{end}=T_{mid}+T_{start}$$

Control then returns to the block 130 and the blocks subsequent thereto as described herein. Note that during subsequent iterations, the distance repersented by the variable Dist$_{CTRfuture}$ is only calculated with respect to the center of the identified beam boundary.

If at the block 170, it is determined that the subscriber unit 11 has not passed over the beam boundary 42 during T$_{interval}$, it is assumed that T$_{end}$ was selected before boundary crossover and control passes to a block 220. At the block 220, T$_{start}$ is set equal to T$_{end}$ and T$_{end}$ is set equal to the previous value of T$_{end}$, T$_{save}$. Recall that in the previos iteration it was determined that the previous value of T$_{end}$ occurred after boundary crossover and, during the current iteration, it has been determined that the current value of T$_{end}$ occurs before crossover. Thus, adjusting T$_{start}$ and T$_{end}$ in this manner ensures that the subscriber has passed the beam boundary during T$_{interval}$.

After T$_{interval}$ has been adjusted at the block 220, control again returns to the block 130 and blocks subsequent thereto as described herein.

If at the block 200 the desired level of accuracy has been achieved such that $T_{interval}$ is less than the value of $T_{acc}$, then control passes to the block 230 where the processor 20 calculates the actual time for handover, $T_{handover}$ as follows:

$$T_{handover} = T_{mid} + T_{start}$$

Thereafter, control proceeds to the block 240 where the processor 20 checks the value of FLAG. If FLAG is set to one (1), thereby indicating that spot beam handover is appropriate, then control proceeds to a block 250 where the processor 20 effects spot beam handover. At the block 250, the processor 20 sends a control signal to the feeder antenna 12 residing at the earth station 14 which, in turn, relays the signal to the satellite 10 that is transmitting the on-going call. The satellite feeder antenna 12 receives the transmitted signal which is subsequently demodulated at the frequency translator 32. The signal extractor 34 supplies the demodulated control signals to the processor 28 which, in response to the control signals, causes the DRA 24 to transmit the control signal to the subscriber via spot beam 38. In addition, information regarding the time of handover and the new frequency at which the call will be transmitted by the future spot beam 40 is transmitted by the satellite DRA 24 to the mobile subscriber unit 11.

If, instead, FLAG is set to zero (0), then control proceeds to a block 260 where the processor 20 effects satellite handover. Satellite handover is initiated when the processor 20 sends a control signal to the feeder antenna 12 which transmits the signal to the feeder antenna 26 residing at the originating satellite 10. The signal received at the satellite feeder antenna 26 is then demodulated at the frequency translator 32 and thereafter extracted by the signal extractor 34. The signal extractor 34 supplies the demodulated control signal to the processor 28 which responds to the signal by transmitting it to the subscriber unit 11. The DRA 24 of satellite 10 transmits the information regarding the time of handover and the new frequency at which the future satellite 13 will transmit the call to the mobile subscriber unit 11. After the call has been transferred the program begins again at the block 100 to prepare for the next call transfer.

Because the actual operations of spot beam handover and satellite handover may be performed in any of a variety of well known ways, the steps performed at the blocks 250 and 260 are provided for illustrative purposes only. Typical handover procedures may include any number of steps such as, for example, ending transmission at the originating beam 38 and beginning transmission at the future beam 40 or determining the new unused frequency at which the call will be carried after handover or it may instead involve other processing steps to ensure signal quality during call transfer.

It will also be understood by one having ordinary skill in the art that the method of the present invention provides geometric simplicity and processing speed gained by tracking the movement of the subscriber in the satellite based coordinate system and using the movement to estimate the time of handover. In addition, although calculated with reference to the earth based coordinate system herein, the angle of elevation may instead by determined relative to the satellite based coordinate system.

While the method of the present invention has been described with reference to a specific set of steps, which are intended to be illustrative only, and not to be limiting of the invention, it will be apparent to those of ordinary skill in the art that changes, additions, and/or deletions may be made to the disclosed embodiment without departing from the spirit and scope of the invention.

What is claimed is:

1. A satellite communication system adapted to transfer a call from a first spot beam to a second spot beam wherein the call is being transmitted between a satellite and a subscriber unit located in the first spot beam, the system comprising:
   a first processor, the first processor being adapted to:
      track a movement of the subscriber unit relative to a satellite based coordinate system;
      identify the second spot beam from among a plurality of spot beams;
      estimate a time at which to transfer the call that is dependent on the position of the subscriber unit relative to the satellite based coordinate system; and
   generate a signal to cause the satellite to transfer the call at the time;
   a second processor being adapted to respond to the signal generated by the first processor;
   a first antenna being associated with the satellite fore generating the first spot beam; and
   a second antenna being associated with the satellite for generating the second spot beam;
   wherein the first antenna and the second antenna are controlled by the second processor; and
   wherein the system is further adapted to transfer the call from a first satellite to a second satellite wherein the first processor is further adapted to
      (a) determine the position of the subscriber unit at the estimated time;
      (b) determine the position of the satellite at the estimated time;
      (c) calculate an angle of elevation using the position of the subscriber unit and the position of the satellite;
      (d) compare the angle of elevation to a threshold angle to determine whether the subscriber unit is moving out of the first footprint into a second footprint that is generated by the second satellite;
      (e) substitute a new time for the estimated time, if the angle of elevation is not less than the threshold angle and thereafter repeat steps (a)–(d); and
      (f) cause the first satellite to transfer the call to the second satellite when the angle of elevation is less than the threshold angle.

2. A method for determining when to transfer a call associated with a first spot beam to a second spot beam in a satellite communication system, wherein the call is being transmitted between, inter alia, a non-geostationary satellite and a subscriber unit located in the first spot beam, the steps comprising:
   tracking a movement of the subscriber unit relative to a satellite based coordinate system,
   estimating a transfer time at which to transfer the call based on the movement of the subscriber unit relative to the satellite based coordinate system,
   causing the satellite to transfer the call at the estimated transfer time, and
   determining when to transfer the call from a first satellite to a second satellite,
   wherein the call is being transmitted from the first satellite to a subscriber unit located in a first footprint, the first footprint being generated by the first satellite, and
   wherein the steps for determining when to transfer the call from the first satellite to the second satellite comprise:
      (a) determining the position of the subscriber unit relative to the satellite based coordinate system at the estimated time;

(b) calculating an angle of elevation using the position of the subscriber unit and a position of the satellite;

(c) comparing the angle of elevation to t threshold angle to determine whether the subscriber unit is moving out of the first footprint into a second footprint, the second foot print being generated by the second satellite;

(d) substituting a new time for the estimated time, if the angle of elevation is not less than the threshold angle and thereafter repeating steps (a)–(c); and (e) causing the first satellite to transfer the call to the second satellite when the angle of elevation is less than the threshold angle.

3. A satellite communication system adapted to transfer a call from a first spot beam to a second spot beam wherein the call is being transmitted between a satellite and a subscriber unit located in the first spot beam, the system comprising:

a first processor, the first processor being adapted to:
track a movement of the subscriber unit relative to a satellite based coordinate system;
identify the second spot beam from among a plurality of spot beams;
estimate a time at which to transfer the call that is dependent on the position of the subscriber unit relative to the satellite based coordinate system; and
generate a signal to cause the satellite to transfer the call at the time;

a second processor being adapted to respond to the signal generated by the first processor;

a first antenna being associated with the satellite fore generating the first spot beam;

a second antenna being associated with the satellite for generating the second spot beam;

a transceiver for receiving signals transmitted by the first processor and for routing the signals to the second processor; and a frequency translator for converting the signals received by the transceiver to a format suitable for controlling the first antenna and the second antenna;

wherein the first antenna and the second antenna are controlled by the second processor.

4. A method for determining when to transfer a call associated with a first spot beam to a second spot beam in a satellite communication system, wherein the call is being transmitted between, inter alia, a non-geostationary satellite and a subscriber unit located in the first spot beam the steps comprising:

tracking a movement of the subscriber unit relative to a satellite based coordinate system, estimating a transfer time at which to transfer the call based on the movement of the subscriber unit relative to the satellite based coordinate system, and causing the satellite to transfer the call at the estimated transfer time, wherein a boundary that is located between the first spot beam and the second spot beam is defined relative to the satellite based coordinate system, the step of estimating a transfer time comprises estimating an interval of time during which the subscriber unit will cross over the boundary, and the step of estimating an interval of time further comprises repeatedly adjusting the interval of time until the interval of time conforms to a desired level of accuracy.

5. A method as defined in claim 4 wherein the interval of time ends at an endpoint and wherein the step of adjusting the interval comprises:

calculating a position of the subscriber unit at the endpoint of the interval;

comparing the position of the subscriber unit at the endpoint to the boundary to determine whether the subscriber unit has crossed over the boundary during the interval;

substituting a new value for the endpoint of the interval if the subscriber unit has not passed over the boundary during the interval; and narrowing the interval if the subscriber unit has passed over the boundary during the interval;

repeating the steps of calculating, comparing, substituting and narrowing until the interval of time conforms to a desired level of accuracy.

6. A method as defined in claim 5 wherein the boundary is located equidistant from a center of the first spot beam and from a center of the second spot beam, and wherein the step of comparing comprises comparing the distance between the position of the subscriber unit at the endpoint and the center of the first spot beam to the distance between the position of the subscriber unit at the endpoint and the center of the second spot beam.

7. A method for determining when to transfer a call associated with a first satellite to a second satellite in a satellite communication system wherein the call is being transmitted from the first satellite to a subscriber unit located in a first footprint, the first footprint being generated by the first satellite, the method comprising of the steps of:

a) estimating a time at which to transfer the call;

b) determining the position of the subscriber unit relative to a satellite based coordinate system at the estimated time;

c) calculating an angle of elevation using the position of the subscriber unit and a position of the satellite;

d) comparing the angle of elevation to a threshold angle to determine whether the subscriber unit is moving out of the first footprint into a second footprint, the second footprint being generated by the second satellite;

e) substituting a new time for the estimated time, if the angle of elevation is not less than the threshold angle and thereafter repeating steps b–d;

f) causing the first satellite to transfer the call to the second satellite when the angle of elevation is less than the threshold angle.

8. A method as defined in claim 7 wherein the step of estimating the time at which to transfer the call and the step of determining the position of the subscriber unit at the estimated time comprise using a velocity of the satellite and an orbital path of the satellite.

* * * * *